US010392304B2

(12) United States Patent
Jardine et al.

(10) Patent No.: US 10,392,304 B2
(45) Date of Patent: Aug. 27, 2019

(54) CEMENT GRINDING ADDITIVE FOR ENABLING PVC EQUIPMENT USE

(71) Applicant: GCP Applied Technologies Inc., Cambridge, MA (US)

(72) Inventors: Leslie A. Jardine, Burlington, MA (US); Josephine H. Cheung, Lexington, MA (US)

(73) Assignee: GCP Applied Technologies Inc., Cambridge, MA (US)

( * ) Notice: Subject to any disclaimer, the term of this patent is extended or adjusted under 35 U.S.C. 154(b) by 476 days.

(21) Appl. No.: 15/023,168

(22) PCT Filed: Sep. 16, 2014

(86) PCT No.: PCT/US2014/055820
§ 371 (c)(1),
(2) Date: Mar. 18, 2016

(87) PCT Pub. No.: WO2015/042031
PCT Pub. Date: Mar. 26, 2015

(65) Prior Publication Data
US 2016/0229746 A1 Aug. 11, 2016

Related U.S. Application Data

(60) Provisional application No. 61/879,178, filed on Sep. 18, 2013, provisional application No. 62/031,555, filed on Jul. 31, 2014.

(51) Int. Cl.
| | |
|---|---|
| *C04B 16/02* | (2006.01) |
| *C04B 16/04* | (2006.01) |
| *C04B 40/00* | (2006.01) |
| C04B 7/00 | (2006.01) |
| C04B 7/34 | (2006.01) |
| C04B 28/00 | (2006.01) |
| C04B 32/00 | (2006.01) |
| C04B 16/00 | (2006.01) |
| C04B 24/00 | (2006.01) |
| C04B 24/10 | (2006.01) |
| C04B 103/52 | (2006.01) |

(52) U.S. Cl.
CPC .......... *C04B 16/04* (2013.01); *C04B 40/0039* (2013.01); *C04B 2103/52* (2013.01)

(58) Field of Classification Search
CPC .................................................... C04B 16/04
USPC ......................................... 106/638, 802, 804
See application file for complete search history.

(56) References Cited

U.S. PATENT DOCUMENTS

| | | |
|---|---|---|
| 4,943,323 A | 7/1990 | Gartner et al. |
| 5,017,234 A | 5/1991 | Gartner et al. |
| 5,084,103 A | 1/1992 | Myers et al. |
| 5,156,679 A | 10/1992 | Gartner et al. |
| 6,213,415 B1 | 4/2001 | Cheung |
| 6,800,129 B2 | 10/2004 | Jardine et al. |
| 6,875,801 B2 | 4/2005 | Shendy et al. |
| 7,160,384 B2 | 1/2007 | Jardine |
| 8,187,376 B2 | 5/2012 | Kuo |
| 8,460,457 B2 | 6/2013 | Cheung |
| 8,758,504 B2 | 6/2014 | Jardine et al. |
| 2004/0072939 A1 | 4/2004 | Cornman et al. |
| 2004/0149172 A1 | 8/2004 | Jardine et al. |
| 2005/0096280 A1 | 5/2005 | Chun et al. |
| 2008/0057206 A1 | 3/2008 | Igo et al. |
| 2009/0101045 A1 | 4/2009 | Lettkeman et al. |
| 2010/0249280 A1 | 9/2010 | MacKlin et al. |
| 2011/0306704 A1 | 12/2011 | Cheung et al. |
| 2012/0137932 A1* | 6/2012 | Cheung ............... C04B 7/52 106/708 |
| 2012/0291676 A1 | 11/2012 | Kuo |
| 2013/0180434 A1* | 7/2013 | Jardine ............ C04B 40/0039 106/503 |

FOREIGN PATENT DOCUMENTS

| | | |
|---|---|---|
| EP | 0415799 | 12/2014 |
| WO | 201122217 | 2/2011 |
| WO | 2012047450 | 4/2012 |

OTHER PUBLICATIONS

Young, Form PCT/ISA/210, International Search Report for PCT/US2014/055820, 3 pages, dated Nov. 24, 2014.
Young, Form PCT/ISA/237, Written Opinion of the International Searching Authority for PCT/US2014/055820, 6 pages, dated Nov. 24, 2014.

* cited by examiner

*Primary Examiner* — James E McDonough
(74) *Attorney, Agent, or Firm* — Craig K. Leon

(57) ABSTRACT

The present invention provides cement grinding additive compositions and methods which allow a PVC-safe, powerful, and robust defoaming agent to be uniformly dispersed throughout a broad concentration range while retaining storage stability even in cases wherein the defoaming agent is highly diluted. Exemplary cement grinding additive compositions comprise at least one amine cement grinding additive; an air detrainer selected from the group consisting of (i) ethoxylated, propoxylated fatty alcohol or alkylphenol, (ii) polyalkoxylated polyalkylene polyamine, or (iii) a mixture thereof.

8 Claims, No Drawings

CEMENT GRINDING ADDITIVE FOR ENABLING PVC EQUIPMENT USE

FIELD OF THE INVENTION

This invention relates to intergrinding manufacture of cement from precursor materials, and more particularly to an alkanolamine-based cement grinding additive with defoamer that enables use of PVC equipment in dispensing the cement grinding additive in liquid form into cement at the grinding plant.

BACKGROUND OF THE INVENTION

In US Patent Publication No. 2013/0180434 A1 which is owned by the common assignee hereof, it was taught to employ tri-iso-butylphosphate ("TIBP") as an air detraining agent (or "defoamer") in combination with one or more alkanolamines such as triisopropanolamine to obtain a uniform distribution in a cement additive product, so as to resist structural degradation of the defoamer caused by the harsh mill temperatures and the mechanical grinding process itself whereby cement is made by inter-grinding precursor materials.

However, the present inventors discovered that use of an aqueous, amine based cement grinding additive with phosphate based defoamers can create problems where polyvinylchloride (PVC) equipment, including pipes, valves, tanks, and other fittings, are used at the cement processing plant. Phosphate-based defoamers, such as TIBP, can degrade polyvinylchloride (PVC) by dissolving the plasticizers used in its manufacture, such as esters of polycarboxylic acids, phosphate esters, phthalate esters, and the like. TIBP may also dissolve plasticizers in natural rubber and rubber-based materials (e.g., BUNA-N, VITON rubbers).

Hence, the present inventors believe there is a need for selecting alternative defoamers that can provide a stable alkanolamine cement additive composition while at the same time enabling use of PVC equipment during cement manufacture.

SUMMARY OF THE INVENTION

The present invention provides a PVC-safe, storage-stable cement additive composition wherein a small concentration of a powerful defoamer is uniformly dispersed throughout the liquid composition, and a method for detraining air in cement using the cement additive composition.

An exemplary cement grinding additive composition of the present invention comprises: (a) at least one amine cement grinding additive comprising triisopropanolamine, diethanolisopropanolamine, diisopropanolethanolamine, tetrahydroxyethylethylenediamine, tetrahydroxy-isopropylethylenediamine, triethanolamine, methyldiethanolamine, diethanolamine, or mixtures thereof; (b) an air detraining agent selected from the group consisting of (i) ethoxylated, propoxylated fatty alcohol or alkylphenol, (ii) polyalkoxylated polyalkylene polyamine, or (iii) mixture thereof; (c) a biopolymer polysaccharide gum selected from the group consisting of Diutan, Welan, and Xanthan; and (d) water in amount of 0.1 to 95.0 percent based on total weight of the cement grinding additive composition, whereby said air detraining agent is uniformly disbursed throughout the cement grinding additive composition.

An exemplary method of the present invention for manufacturing cement comprises: introducing to cement clinker, before or during the grinding thereof to produce hydratable cement, the afore-mentioned cement additive composition. In preferred embodiments, PVC equipment such as pipes, valves, (storage) tanks, and fittings are employed in dispensing the cement additive composition into the cement or precursor materials in the grinding operation which produces the cement.

A primary advantage of the invention is that the cement grinding additive compositions are safe for use with all materials of construction commonly found in cement processing plants. Moreover, the defoamers resist structural degradation caused by the harsh cement grinding mill temperatures and the mechanical grinding process itself. Typically, the use of powerful defoamers makes it difficult to obtain a uniform distribution throughout the cement additive product and the resultant cement, especially as concentrations used are minute.

Thus, the present invention provides a novel composition and method wherein a powerful defoamer is uniformly distributed through an aqueous cement additive formulation, both in its as-delivered form (e.g., as a concentrate), and when the additive is diluted up to 8:1 with water by the customer for use at the cement grinding mill.

Unlike triisobutylphosphate, the defoamers are not partially solubilized by triisopropanolamine, a commonly cement additive component that requires a defoamer. While triisobutylphosphate requires additional stabilization in dilute aqueous cement additive formulations (having greater than 20% water), use of these defoamers require stabilization in all aqueous formulations.

Further embodiments of the invention are described in further detail hereinafter.

DETAILED DESCRIPTION OF EXEMPLARY EMBODIMENTS

The cement additive compositions and methods of the present invention may be used with or in conventional grinding mills, such as ball mills (or tube mills). The present inventors also believe that they can be applied in mills employing rollers (e.g., vertical rollers, rollers on tables, etc.). See e.g., U.S. Pat. No. 6,213,415 of Cheung. The cement grinding additive compositions are believed to withstand grinding temperatures which can be in the range of 50 to 150 degrees Celcius.

The term "cement" as used herein includes hydratable Portland cement which is produced by pulverizing clinker consisting of hydraulic calcium silicates and one or more forms of calcium sulfate (e.g., gypsum) as an interground additive. The term "cementitious" as used herein refers to materials that comprise Portland cement or which otherwise function as a binder to hold together fine aggregates (e.g., sand), coarse aggregates (e.g., crushed gravel), or mixtures thereof.

Included in the definition of cement and cementitious materials, and often referred to as supplemental cementitious materials, are fly ash, granulated blast furnace slag, limestone, natural pozzolans, or mixtures of these materials. Typically, Portland cement is combined with one or more other cementitious materials, such as the foregoing supplemental cementitious materials, and provided as a blend. The cement additive composition and method of the present invention, however, can be used separately for grinding Portland cement, or any of the other cementitious materials, independently, or in any combination.

The term "hydratable" as used herein is intended to refer to cement and/or cementitious materials that are hardened by chemical interaction with water. Portland cement clinker is a partially fused mass primarily composed of hydratable calcium silicates. The calcium silicates are essentially a mixture of tricalcium silicate (3CaO.SiO$_2$ "C$_3$S" in cement chemists notation) and dicalcium silicate (2CaO.SiO$_2$, "C$_2$S") in which the former is the dominant form, with lesser amounts of tricalcium aluminate (3CaO.Al$_2$O$_3$, "C$_3$A") and tetracalcium aluminoferrite (4CaO.Al$_2$O$_3$—Fe$_2$O$_3$, "C$_4$AF"). See e.g., Dodson, Vance H., *Concrete Admixtures* (Van Nostrand Reinhold, New York N.Y. 1990), page 1.

As described in the summary section above, cement grinding additive composition and methods of the invention involve the use of the following components.

Exemplary grinding additive compositions and methods of the invention contain at least one amine cement grinding additive which comprises triisopropanolamine, diethanolisopropanolamine, diisopropanolethanolamine, tetrahydroxy-ethylethylenediamine, tetrahydroxyisopropylethylenediamine, triethanolamine, methyldiethanolamine, diethanolamine, or mixtures thereof. Of these, triisopropanolamine (TIPA) is preferred.

The use of TIPA should be in the amount of up to 0.2 percent based on weight of cement clinker, and is preferably used in combination with triethanolamine (TEA), as described in European Patent No. 0 415 799 B1, owned by the common assignee hereof.

Another preferred combination is tetrahydroxyethylethylenediamine (THEED) with TEA, as disclosed in U.S. Pat. No. 7,160,384, also owned by the common assignee hereof. The one or more amine cement grinding additives may be present in an amount of 1.0 to 99.0 percent based on total weight of the cement grinding additive composition.

Exemplary cement grinding additive compositions and methods of the invention also involve the use of an air-detraining ethoxylated, propoxylated fatty alcohol or alkylphenol represented by formula (I) or (II):

$$CH_3(CH_2)_xCH_2-O(CH_2CH_2O)_n(CH_2CH(CH_3)O)_mH \quad (I)$$

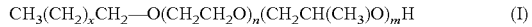

$$R^1-R^2-O(CH_2CH_2O)_n(CH_2CH(CH_3)O)_mH \quad (II)$$

wherein "x" represents an integer of =2-18; "n" and "m" each represent an integer of 3 to 15; R$^1$ represents an alkyl group having 4 to 12 carbons (and preferably R$^1$ represents a linear C$_9$H$_{19}$ group); and R$^2$ represents a benzene ring;

the at least one air-entraining cement additive and the ethoxylated, propoxylated fatty alcohol or alkylphenol (both hereinafter "EPFA") being present by weight within the ratio (alkanolamine:EPFA) of 19:1 to 1:1 by dry solids weight.

Exemplary cement grinding additive compositions and methods of the invention also involve the use of air detraining agent polyalkoxylated polyalkylene polyamine defoamer formed by alkoxylating a polyalkylene polyamine with ethylene oxide, propylene oxide, or mixture thereof, wherein the amount of ethylene oxide groups is in the range of 0-40 percent based on total weight of polyethers, and the amount of polypropylene oxide groups is in the range of 60-100 percent based on total weight of polyethers, the molar ratio of propylene oxide to ethylene oxide being greater than 1, the polyalkoxylated polyalkylene polyamine defoamer having a structure represented by formula (1)

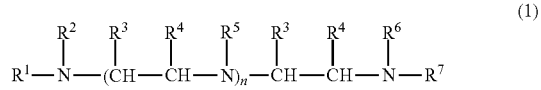

or salt thereof, or combination of the defoamer and salt thereof, wherein each of R$^1$, R$^2$, R$^3$, R$^4$ R$^5$, R$^6$, and R$^2$ independently represents a hydrogen, C$_1$-C$_4$ alkyl group, —CH$_2$—OH, or -(AO)$_x$—R$^8$ wherein AO represents propylene oxide ("PO") or a mixture of PO and ethylene oxide ("EO") wherein the molar ratio of PO to EO is at least 100:0 to 100:90; "x" represents an integer of 0 to 100; and R$^8$ represents hydrogen or an alkyl group; "n" represents an integer of 0 to 100; and wherein, if "n" is 0 then the amount of EO is less than 10 percent by weight based on total weight of the polyalkoxylated polyalkylene polyamine defoamer.

Preferably, the air detraining agents are present in an amount of 0.05 to 5.0 percent, and more preferably in the range of 0.4 to 3.0 percent, based on total weight of the cement grinding additive composition. In most preferred cement grinding additive compositions and methods of the invention, the weight ratio of the amine cement grinding additive component to the air detraining agent component is 100:2 to 100:10 based on dry solids weight; and, most preferred, the weight ratio is 100:5 to 100:10.

In further exemplary cement grinding additive compositions and methods of the invention, the air detraining agent or agents can be used optionally with glycol cement grinding additives such as diethylene glycol (DEG) and monoethylene glycol (MEG). The inventors believe that DEG and MEG can provide some strength-enhancement when combined with the air detraining agents and that such glycols can be used in conventional amounts as known in the art. Hence, further exemplary cement grinding additive compositions and methods of the invention further comprise at least one glycol cement grinding additive component.

Exemplary cement grinding additive compositions and methods of the invention further involve the use of a biopolymer polysaccharide selected from the group consisting of Diutan gum (S-657), Whelan gum, and Xanthan gum. Diutan and Whelan are more preferred, and Diutan most preferred. The biopolymer polysaccharide is preferably used in an amount of 0.01 to 1.0 percent, and more preferably 0.1 percent to 0.3 percent, based on total weight of the cement grinding additive composition.

Finally, exemplary compositions and methods of the invention further involve the use of water, which should be present in an amount of 0.10 to 95.0 percent, and more preferably 20.0 to 60.0 percent, based on total weight of the cement grinding additive composition. This means that the invention covers concentrated forms wherein the cement grinding additive composition is nearly water-free, such that it would not allow for solubilization or complete solubilization of the gum, such that the cement additive product can be shipped to the cement manufacturer customer with a low viscosity, and the customer can subsequently add water to dilute the product in "day tanks" so as to render the stabilizing agent (e.g., gum) soluble.

Preferably, the viscosity of exemplary cement grinding additive compositions of the invention should be 25-5000 centipoise ("cp"), and more preferably in the range of 100-3000 cp, as measured at 20 degrees Celcius (Brookfield viscometer; spindle 27, 3 rpm).

Preferred cement grinding additive compositions of the invention should have a storage stability, or, in other words, the ability to resist physical separation of components. For example, if placed into a conventional vessel such as glass beaker, glass test tube, or more preferably a separatory funnel, exemplary cement grinding additive compositions of the invention should display a homogeneity or uniformity of air detrainer dispersal within the entire volume of the composition wherein the average concentrations of air detrainer between the top and bottom one-third fractions of the vessel should not differ by more than 20%; more preferably they should not differ by more than 10%; and, most preferably, they should not differ by more than 2%, when stored at 50 degrees Celcius for 10 days. The stability of the air detrainer and total formulation can be confirmed using a turbidity meter whereby any changes over time can be monitored.

It is contemplated that certain conventional grinding additive components may be incorporated into the exemplary cement grinding additive compositions of the present invention. In addition to glycols which were previously mentioned above, further exemplary compositions of the invention may include acetic acid or acetate, glycerol, salts (e.g., sodium chloride, calcium chloride, calcium nitrite, calcium nitrate, sodium gluconate), and sugars (e.g., corn syrup, molasses, citric acid, sucrose), and polycarboxylate polymers, all of which may be used in percentages as known to those of ordinary skill.

As summarized above, an exemplary method of the present invention for manufacturing cement comprises introducing to cement clinker, before or during the grinding thereof to produce hydratable cement, the afore-mentioned storage stable cement additive composition comprising (a) at least one amine cement grinding additive comprising triisopropanolamine, diethanolisopropanolamine, diisopropanolethanolamine, tetrahydroxyethyl-ethylenediamine, tetrahydroxyisopropyl-ethylenediamine, triethanolamine, methyldiethanolamine, diethanolamine, or mixtures thereof; (b) an air detrainer comprised of (i) ethoxylated, propoxylated fatty alcohol or alkylphenol, (ii) polyalkoxylated polyalkylene polyamine, or (iii) a mixture thereof; (c) a biopolymer polysaccharide gum selected from the group consisting of Diutan, Whelan, and Xanthan; and (d) water, the components (a) through (b) being present in accordance in the ranges described above, whereby an air detrainer comprised of (i) ethoxylated, propoxylated fatty alcohol or alkylphenol, (ii) polyalkoxylated polyalkylene polyamine, or (iii) mixture thereof, is uniformly disbursed throughout the cement grinding additive composition.

Cements produced by the exemplary processes of the invention are expected to have reduced air content, when water is added to hydrate the cement, in comparison to cement clinker that has been ground the same amount (to the same extent) and that has the same amount of amine grinding additive but without the air detraining agent present.

Exemplary methods of the present invention enable the dispensing of a stabilized cement additive composition. Thus, an exemplary method involves grinding cement by dispensing into the cement during grinding, preferably using using polyvinylchloride equipment selected from pipes, valves, (storage) tanks, and fittings, or a combination thereof, of a cement grinding additive composition comprising: (a) at least one amine cement grinding additive comprising triisopropanolamine, diethanolisopropanolamine, diisopropanolethanolamine, tetrahydroxyethylethylene-diamine, tetrahydroxy-isopropylethylenediamine, triethanolamine, methyldiethanol-amine, diethanolamine, or mixtures thereof; (b) an air detraining agent selected from the group consisting of (i) ethoxylated, propoxylated fatty alcohol or alkylphenol, (ii) polyalkoxylated polyalkylene polyamine, or (iii) mixture thereof; (c) a biopolymer polysaccharide gum selected from the group consisting of Diutan, Welan, and Xanthan; and (d) water in amount of 0.10 to 95.0 percent based on total weight of the cement grinding additive composition, whereby the air detrainer is uniformly disbursed throughout the cement grinding additive composition.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: $R=RL+k*(RU-RL)$, where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above, is also specifically disclosed.

Example 1

The following cement grinding additive compositions were made in accordance with the following formulations, all percentages being based on the total weight of the composition.

The composition formulations are summarized below in Table 1.

TABLE 1

|  | Percent in formula |
| --- | --- |
| 19363-163F |  |
| Triisopropanolamine (85%) | 31.37% |
| ($C_{16-18}$) Alkyl alcohol ethoxylate propoxylate | 0.94% |
| Diutan gum | 0.17% |
| Diethylene glycol | 53.30% |
| Water | 14.22% |
| 19363-161G |  |
| Triisopropanolamine (85%) | 31.37% |
| ($C_{16-18}$) Alkyl alcohol ethoxylate propoxylate | 0.94% |
| Diutan gum | 0.12% |
| Diethylene glycol | 53.30% |
| Water | 14.25% |
| 19363-161A |  |
| Triisopropanolamine (85%) | 31.37% |
| Diethylene glycol | 53.30% |
| Water | 15.40% |

The formulation samples were stored in separatory funnels for 10 days at 100 degrees Fahrenheit in an attempt to accelerate separation of the ($C_{16-18}$) alkyl alcohol ethoxylate propoxylate within the samples. The samples were then each divided into thirds, isolating the bottom third fraction, middle third fraction, and top third fraction of the material in the separatory funnels.

Several of these samples were evaluated for their effect on air entrainment in cement mortar prepared according to ASTM C185. An ordinary Portland cement was used in the qualification. Standard deviation for the ASTM C185 test is 0.5%. Each additive was added at 0.04% based on the weight of cement. Air was more than 1% lower in all samples containing stabilized defoamer, compared with mortar containing 19363-161A without defoamer. With 19363-161G, air was lower in the top fraction than in the bottom fraction, indicating some separation of the defoamer between the top and bottom sample. 0.12% Diutan gum was not enough to completely stabilize the defoamer. There was little difference perceived in air between the top and bottom fractions of 19363-163F, indicating that 0.17% Diutan gum was sufficient to stabilize the defoamer.

These results are summarized below in Table 2.

TABLE 2

|  | C185 flow % | C 185 Air % for 10 day samples |
|---|---|---|
| 19363-163F top fraction | 81 | 4.86 |
| 19363-163F middle fraction | 87 | 4.73 |
| 19363-163F bottom fraction | 86 | 4.72 |
| 19363-161G top fraction | 84 | 3.83 |
| 19363-161G middle fraction | 83 | 4.30 |
| 19363-161G bottom fraction | 84 | 4.53 |
| 19363-161A run 1 | 83 | 6.22 |
| 19363-161A run 2 | 81 | 5.95 |

Example 2

The following cement grinding additive compositions were made in accordance with the following formulations, all percentages being based on the total weight of the composition.

The components are summarized below in Table 3.

TABLE 3

|  | Percent in formula |
|---|---|
| 19363-164D | |
| Triisopropanolamine (85%) | 31.37% |
| ($C_{16-18}$) Alkyl alcohol ethoxylate propoxylate | 1.33% |
| Diutan gum | 0.12% |
| Diethylene glycol | 53.30% |
| Water | 14.22% |
| 19363-164E | |
| Triisopropanolamine (85%) | 31.37% |
| ($C_{16-18}$) Alkyl alcohol ethoxylate propoxylate | 1.33% |
| Diutan gum | 0.17% |
| Diethylene glycol | 53.30% |
| Water | 14.25% |
| 16393-165B | |
| Triisopropanolamine (85%) | 31.37% |
| ($C_{16-18}$) Alkyl alcohol ethoxylate propoxylate | 1.33% |
| Diethylene glycol | 53.30% |
| Water | 14.25% |

Change in turbidity was measured over time using a Turbiscan AGS turbimeter. A change of 2% in turbidity (Delta T) is considered significant to indicate a critical separation in the formulation. The final reading was taken 30 days after the initial reading. All values for 16393-165B at all test temperatures (23.8 C, 38 C, and 50 C) were over 2%, indicating a significant change in turbidity, and thus significant separation. For sample 19363-164D, prepared with 0.12% Diutan gum, by weight of the total formulation, separation occurred at 50° C. only in the middle and bottom fractions of the sample, and this suggests greater than 2% change in turbidity. Sample 19363-164E, prepared with 0.17% Diutan gum, showed no significant change in turbidity, and thus no separation. In this particular formulation, use of 0.17% diutan gum was required for full stabilization.

The results are summarized in Table 4 below.

TABLE 4

| Turbican at 30 days 2% is signficant | 19363-164D Delta T | 19363-164E Delta T | 16393-165B Delta T |
|---|---|---|---|
| 23.8 C. | | | |
| Top | 0.08% | 0.59% | 30.53% |
| Middle | 0.72% | 0.53% | 34.87% |
| Bottom | 0.54% | 0.44% | 2.16% |
| 38 C. | | | |
| Top | 1.41% | 0.59% | 25.86% |
| Middle | 1.04% | 0.40% | 25.74% |
| Bottom | 1.19% | 0.33% | 3.96% |
| 50 C. | | | |
| Top | 1.30% | 0.91% | 20.43% |
| Middle | 2.52% | 0.61% | 15.07% |
| Bottom | 4.10% | 0.53% | 4.25% |

Example 3

The following cement grinding additive compositions were made in accordance with the following formulations, all percentages being based on the total weight of the composition.

The formulations are summarized in Table 5 below.

TABLE 5

|  | Percent in formula |
|---|---|
| 19363-165D | |
| Triisopropanolamine (85%) | 31.37% |
| Propoxylated Diethylene Triamine | 1.33% |
| Diutan gum | 0.12% |
| Diethylene glycol | 53.30% |
| Water | 14.22% |
| 19363-165E | |
| Triisopropanolamine (85%) | 31.37% |
| Propoxylated Diethylene Triamine | 1.33% |
| Diutan gum | 0.17% |
| Diethylene glycol | 53.30% |
| Water | 14.25% |

Change in turbidity was measured over time using a Turbiscan AGS. A change of 2% in turbidity (Delta T) is considered significant. The final reading was taken 30 days after the initial reading. For sample 19363-165D, prepared with 0.12% diutan gum, by weight of the total formulation, separation occurred at 38 C only in all fractions, which showed greater than 2% change in turbidity. Sample 19363-

165E, prepared with 0.17% diutan gum, showed no significant change in turbidity, and thus no separation. In this particular formulation, use of 0.17% diutan gum was required for full stabilization.

The results are summarized in Table 6 below.

TABLE 6

| 30 days | 19363-165D Delta T | 19363-165E Delta T |
|---|---|---|
| 23.8 C. | | |
| Top | 1.68% | 1.09% |
| Middle | 1.02% | 0.81% |
| Bottom | 0.43% | 0.50% |
| 38 C. | | |
| Top | 22.21% | 1.57% |
| Middle | 9.27% | 0.75% |
| Bottom | 4.39% | 1.29% |
| 50 C. | | |
| Top | 1.80% | 1.85% |
| Middle | 2.00% | 1.17% |
| Bottom | 1.91% | 1.80% |

The foregoing preferred embodiments and examples were presented for illustrative purposes and not intended to limit the scope of the invention.

It is claimed:

1. A method for manufacturing cement, comprising:
   introducing a cement grinding additive composition into a manufacturing operation whereby cement clinker and precursor materials are ground into cement, the cement grinding additive composition being introduced through PVC equipment comprising pipes, valves, storage tanks, fittings, or combination thereof;
   the cement grinding additive composition comprising:
   (a) at least one amine cement grinding additive comprising triisopropanolamine, diethanolisopropanolamine, diisopropanolethanolamine, tetrahydroxyethylethylenediamine, tetrahydroxy-isopropylethylenediamine, triethanolamine, methyldiethanolamine, diethanolamine, or mixtures thereof, the at least one amine cement grinding additive being present in an amount of 5.0 to 99.0 percent by weight of the cement grinding additive composition;
   (b) an air detraining agent selected from the group consisting of (i) ethoxylated, propoxylated fatty alcohol or alkylphenol, (ii) polyalkoxylated polyalkylene polyamine, and (iii) mixture thereof, the air detraining agent being present in an amount of 0.1 to 5.0 percent by weight of the cement grinding additive composition;
   (c) a biopolymer polysaccharide gum selected from the group consisting of Diutan, Welan, and Xanthan, the gum being present in an amount of 0.01 to 1.0 percent by weight of the cement grinding additive composition; and
   (d) water in amount of 0.10 to 60 percent by weight of the cement grinding additive composition;
   the foregoing components (a), (b), (c), and (d) of the cement grinding additive composition uniformly mixed together whereby said air detraining agent is uniformly disbursed throughout the cement grinding additive composition during introduction to the cement clinker and precursor materials;
   grinding the cement clinker, precursor materials, and cement grinding additive composition together to obtain ground cement comprising the air detraining agent uniformly disbursed throughout the ground cement.

2. The method of claim 1 wherein the cement grinding additive composition further comprises an additive selected from the group consisting of diethylene glycol, monoethylene glycol, or a mixture thereof.

3. The method of claim 1 wherein the cement grinding additive composition further comprises an additive selected from the group consisting of a glycol, glycerol, acetic acid or acetate, salt, sugar, and mixtures thereof.

4. The method of claim 1 wherein the cement grinding additive composition comprises an air-detraining ethoxylated, propoxylated fatty alcohol or alkylphenol represented by formula (I) or (II):

$$CH_3(CH_2)_xCH_2\text{---}O(CH_2CH_2O)_n(CH_2CH(CH_3)O)_mH \quad (I)$$

$$R^1\text{---}R^2\text{---}O(CH_2CH_2O)_n(CH_2CH(CH_3)O)_mH \quad (II)$$

wherein "x" represents an integer of =2-18; "n" and "m" each represent an integer of 3 to 15; $R^1$ represents an alkyl group having 4 to 12 carbons (and preferably $R^1$ represents a linear $C_9H_{19}$ group); and $R^2$ represents a benzene ring;
   the at least one air-entraining amine cement additive and the ethoxylated, propoxylated fatty alcohol or alkylphenol (both hereinafter "EPFA") being present by weight within the ratio (alkanolamine:EPFA) of 19:1 to 1:1 by dry solids weight.

5. The method of claim 1 wherein the cement grinding additive composition comprises a polyalkoxylated polyalkylene polyamine defoamer having a structure represented by formula (1)

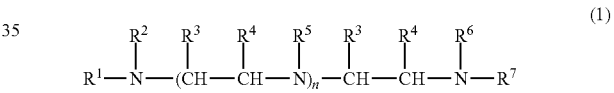

or salt thereof, or combination of the defoamer and salt thereof, wherein each of $R^1$, $R^2$, $R^3$, $R^4$, $R^5$, $R^6$, and $R^7$ independently represents a hydrogen, $C_1$-$C_4$ alkyl group, —$CH_2$—OH, or $(AO)_x$—$R^8$ wherein at least one of $R^1$, $R^2$, $R^3$, $R^4$, $R^5$, $R^6$, and $R^7$ comprises an -$(AO)_x$—$R^8$ group and wherein AO represents propylene oxide ("PO") or a mixture of PO and ethylene oxide ("EO") wherein the molar ratio of PO to EO is at least 100:0 to 100:90; "x" represents an integer of 1 to 100; and $R^8$ represents hydrogen or an alkyl group; "n" represents an integer of 1 to 100; and
   wherein, if "n" is 0, then the amount of EO is less than 10% by weight of the polyalkoxylated polyalkylene polyamine defoamer.

6. The method of claim 1 wherein the cement grinding additive composition further comprise a polycarboxylate polymer.

7. The method of claim 1 wherein the cement additive grinding composition has a viscosity of 100-3000 cp as measured at 20 degrees Celcius, when using Brookfield viscometer, spindle 27, 3 rpm.

8. The method of claim 1 wherein cement grinding additive compositions of the invention displays uniformity of air detrainer dispersal within the composition whereby the average concentrations of air detrainer between the top and bottom one-third fractions of the vessel should not differ by more than 10%.

* * * * *